Dec. 19, 1939.   K. V. HART   2,183,564
FABRICATED SPRING STRUCTURE AND METHOD OF MAKING SAME
Filed Aug. 26, 1937   2 Sheets-Sheet 1
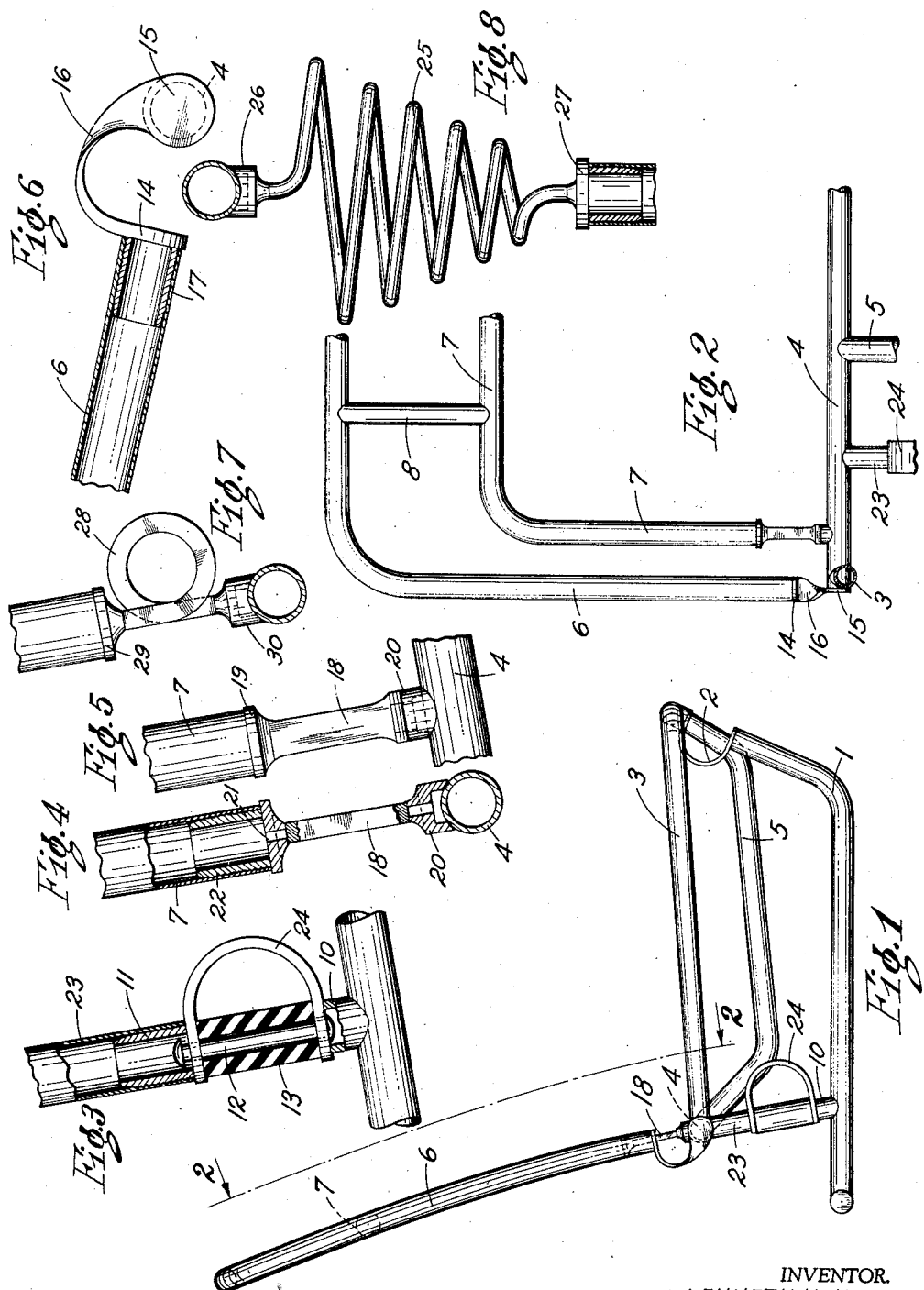
INVENTOR.
KENNETH V. HART
BY
Richey & Watts
ATTORNEYS Dec. 19, 1939. K. V. HART 2,183,564
FABRICATED SPRING STRUCTURE AND METHOD OF MAKING SAME
Filed Aug. 26, 1937 2 Sheets-Sheet 2

INVENTOR.
KENNETH V. HART
BY Richey Watts
ATTORNEYS

Patented Dec. 19, 1939

2,183,564

UNITED STATES PATENT OFFICE 2,183,564

FABRICATED SPRING STRUCTURE AND METHOD OF MAKING SAME

Kenneth V. Hart, Cleveland, Ohio

Application August 26, 1937, Serial No. 161,073

13 Claims. (Cl. 267—1)

This invention relates to an improvement in fabricated structures by which they may have resiliency or springiness, and more particularly to certain improvements in tubular structures which incorporate spring joints that provide resiliency where desired in the structure, and to methods of producing such structures and joints.

In my co-pending United States patent applications, Serial No. 1102, filed January 10, 1935; and Serial No. 68,785, filed March 13, 1936 (now Patent No. 2,091,982 granted September 7, 1938); and Serial No. 161,072, filed August 26, 1937, I have described and claimed certain improvements in joints and methods of producing them. In the present invention I contemplate the employment of my improved joints and methods to make possible the construction of resilient or springy metal structures, preferably including tubular parts, such as automobile seat frames, bicycles, metal furniture, and other frames which require resiliency at certain points.

In such metallic structures it is often desirable to impart resiliency or springiness of a definite degree at certain points and to provide shock absorbing connections which will tend to increase the life and utility of the article.

It is among the objects of my invention to provide a resilient or springy connection between stiffer members, which connection will occupy a minimum of space and which may be built into various tubular structures to incorporate the desired resiliency in the necessary locations. Other objects of my invention are the provision of an improved type of resilient tubular frame construction which may be adapted to a large number of uses; the provision of a structure including a spring welded to one or more members, the properties of which spring have not been adversely affected by the welding operation; and the provision of a resilient tubular structure having great strength and being of extremely simple design and susceptible to economical manufacture.

My spring connections may be made by suitably forming and tempering a spring steel member, as for instance a leaf or U-shaped member, and welding it to the ends of tubular members it is intended to connect by the process described in my co-pending applications above identified. In this process, the first step is preferably to provide the end of a tubular member with a reinforcing insert which has a knurled or otherwise roughened surface and which is firmly secured in place by having the projections on its surface embedded in the inner surface of the tube. The reinforced tube end is then shaped to provide a narrow zone of contact with the surface of the spring member, with the contact zone spaced from the outer circumferential edge of the tube-end and raised slightly above such edge. The parts are then brought into contact at that contact zone, and while they are pressed together under heavy pressure, heavy welding current of very short duration is passed between them and a weld is almost instantaneously made.

The weld produced in this way, as more fully set forth in my said co-pending applications, is a surface weld. In such a weld change in the original metallurgical and physical characteristics of the parts is minimized, and any change which does occur is limited to a very thin layer at the weld itself; so that in the spring member there is no practical loss in strength or elasticity of the metal at and near the joint. Moreover, since the weld is made without deformation or extrusion of metal at the joint, and even without discoloration if done under water, the original surfaces of the parts will extend in their pre-existing condition up to their line of meeting at the joint and if the parts are finished prior to welding, the joint as it comes from the welding operation will be completely finished.

I am able to make structures embodying this invention and including one or more spring members and a tube or tubes composed of various metals including aluminum alloys, stainless steel and high carbon steel.

In my method of incorporating resilient members in fabricated structures, in whatever way it may be applied, the welding together of the fabricated structure involves no harmful heating of the spring members or damage to the finish of the parts, so that the characteristics of such spring members may be completely predetermined, and a definite resilience may be imparted to a structure, not only in single instances but consistently in commercial production, with assurance that the predetermined characteristics will be present in the final structures.

The above noted and other objects and advantages of my invention will appear from the following description of several forms of spring connections between tubular members and several structures in which my resilient connections are embodied, reference being had to the accompanying drawings, in which:

Figure 1 is an end elevation of a seat frame embodying the present invention;

Figure 2 is a fragmentary front elevation taken on line 2—2 of Fig. 1;

Figure 3 is an enlarged detailed view of one spring shown in Fig. 1;

Figure 4 is an enlarged, fragmentary, partly sectional view of another spring shown in Fig. 1;

Figure 5 is a side elevation of the construction shown in Figure 4;

Figure 6 illustrates another modification of a spring between a tubular member and another member;

Figure 7 illustrates a coil spring connection between tubular members;

Figure 8 shows a tapered coil spring connecting two tubular members;

Figure 10:
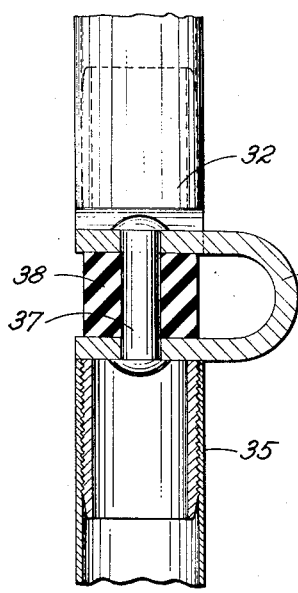
Figure 10 is a partly sectional view taken on line 10—10 of Fig. 9.

The tubular automobile seat frame shown in Figures 1 and 2 is designed to support the cushions of the seats of automobile busses, truck and passenger vehicles. By incorporating spring connections at a number of places in the tubular structure the entire frame may be made resilient to any desired degree thus making possible the use of thinner and cheaper seat cushions and greatly improving the comfort of the seat.

As is best seen in Figures 1 and 2, the supporting tubes 1 are adapted to rest upon the floor of the vehicle, or be otherwise suitably supported, and their upwardly bent forward ends are connected by U-shaped spring members 2 to the outside tube 3 of the seat. The tube 3 extends around three sides of the seat and its ends are welded to the rear transverse tube 4 near its ends. The transverse tube 4 is spring-supported on two of the base-tubes 1 by means of a spring connection such as that shown in Fig. 3. Seat cushions supporting tubes 5 are welded at their ends to the tubes 3 and 4 respectively. The outside back member 6 is connected at its ends to the ends of the tube 4 by means of spring joints of the type shown in Figure 6 and the inside back member 7 is connected to the tube 4 of the seat frame by resilient joints of the type shown in Figures 4 and 5. Reinforcing tube 8 extends between the horizontal portions of the tubes 6 and 7 and interconnects such tubes 6 and 7.

The U-shaped springs 2, at the front of the seat shown in Figure 1, may be of less resiliency than the spring supports for the rear of such seat, so that they will be essentially "spring hinges". That is, while the springs 2 will give some vertical resilience, they will serve mainly to permit the seat to pivot resiliently about the front stretch of the outside tube 3. The rear spring-support provided by the springs 24, however, will permit considerable vertical resilient motion; and the effect of the interaction of the two springs will be that the seat will rock backwardly and downwardly about the forward edge of the seat—or about the knees of a person sitting in the seat.

The spring hinges shown in Figure 1 are preferably made by first shaping a flat strip of unhardened spring-stock into the form of a U, then hardening the resulting member 2, then finishing such spring 2, and then welding the outer flat sides of the U to the adjoining tubes, one of such sides being welded directly to the end-face of a base tube 1 and the other side being welded to a nipple 2' which in turn is welded to the under side of the front stretch of the tube 3. The welds at the sides of the spring 2 are annular and are made in accordance with the process of my aforesaid co-pending applications. The term "annular" as used herein in reference to welds or members is intended to mean and include a closed or endless figure, such as a circle, oval, rectangle or other polygonal shape, and one of which all parts do not necessarily lie in the same plane.

A spring support suitable for use at the rear of the seat-frame is illustrated in Fig. 2. The U-shaped flat metal spring member 24 has welded to it at one side a short tube section 10 which in turn is welded by an annular resistance surface weld to a base-tube 1. The end of the insert 11, and also the tube 23, if it be of weldable material, are welded directly to the flat face at the other side of the spring 24. In order to prevent undesired expansion of the spring 24 a rod 12 is provided which passes freely through holes in the ends of the spring 24 and has riveted over heads which limit the expansion of the spring. If desired, a rubber or other resilient material compression sleeve 13 may be disposed around the pin 12 between the ends of the spring 24. The rubber compression member will modify the action of the spring 24 and serve somewhat as a shock absorber.

The ends of the outer back-frame tube 6 are desirably connected to the ends of the tube 4 by the twisted flat metal spring arrangement shown in Figure 6. In this form of my invention the flat end-portions 14 and 15 of the twisted spring member 16 are welded by my improved joint and process to the tubes 6 and 4 respectively and to the inserts such as 17 which are preferably used. This form of joint is particularly useful in providing a resilient hinge connection between the ends of two tubes extending at right angles to each other.

A connection suitable for use between the ends of the back-frame tube 7 and the side of the tube 4 is shown in Figures 4 and 5 and comprises a flat metal spring member 18 to which are welded low carbon steel end members 19 and 20. Referring to Figure 4, it will be seen that the upper end member 19 is disk shaped and is provided with a flat surface 21 to which is welded the end of the tube 7 and the insert 22 therein. The lower end of the spring member 18 is welded to the low carbon steel cup-shaped member 20, the end of which is shaped and welded to the side of the tube 4.

In some cases it may be desirable to substitute for the springs 24 springs of the type shown in Figure 8 in which a tapered coil spring 25, preferably of round rod wire, is welded to the readily weldable end pieces 26 and 27 which in turn are welded to the adjacent tubes by annular resistance surface welds.

In like manner springs of the type shown in Figure 7 might be substituted for springs 2, 18 or 16 of Figures 1, 5 and 6. In Figure 7 a coil spring 28 is welded to the end pieces 29 and 30 which are in turn welded to the adjoining tubular members.

In the spring construction shown in Figures 4, 5, 7 and 8, I weld the untempered spring member to the end pieces either before or after the spring member has been properly formed. This assembly is then subjected to treatment suitable to develop spring characteristics in the metal of the spring member, as for example suitable hardening and tempering operations.

After the development of the spring characteristics this assembly may be given a desired polished or plated finish and then welded to its associated parts in the structure by the joints and procedure described in my co-pending applications.

The springs are preferably made of material which will possess spring qualities after the hardening and tempering treatment, such as untempered spring steel; and the end pieces are preferably made of readily weldable material which is not detrimentally affected by the hardening and tempering treatment, such as low carbon steel.

Where the tubes of the joints have reinforcing inserts, such as 11, 22 and 17 of Figures 3, 4 and 6, they are secured in the ends of their respective tubular members by knurling or otherwise roughening them and embedding the projections in the inner surface of their associated tube. This may be done by swaging or drawing the tube down over the knurled insert, as is fully described in my said co-pending applications.

Figure 9:
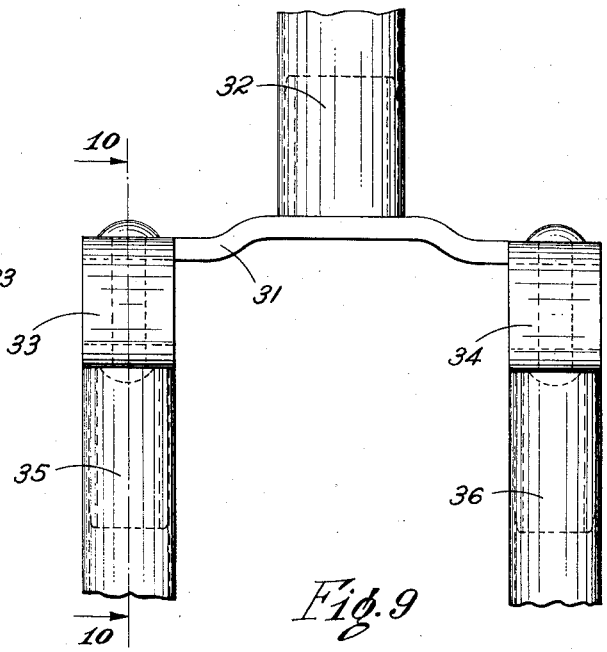
Figure 9 is an elevational view of a bicycle spring front fork construction embodying the present invention.

In Figures 9 and 10 I have illustrated another embodiment of my resilient connections. The structure illustrated is a front fork of a bicycle. A plate 31 is welded to the lower end of the post 32 and has rearwardly extending end portions which are bent to form springs 33 and 34. The lower side of each of these springs is in turn welded to the end of one of the fork members 35 and 36 thus providing an extremely simple, strong and economical spring-fork construction. A pin 37 and rubber bushing 38 may be used if desired. The pin 37 passes loosely through holes in the spring members and prevents the spring from opening too wide while the rubber sleeve 38 acts as a compression shock absorber.

Figure 11:
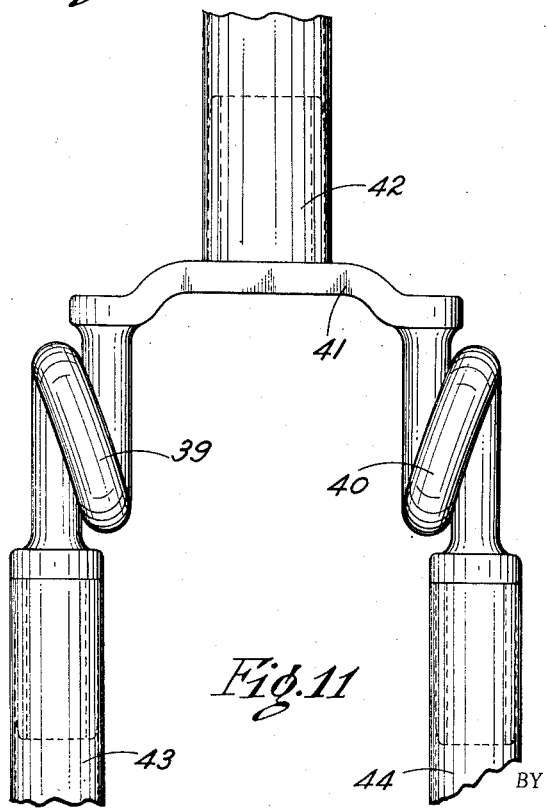
Figure 11 illustrates another form of bicycle spring fork construction.
Figure 12:
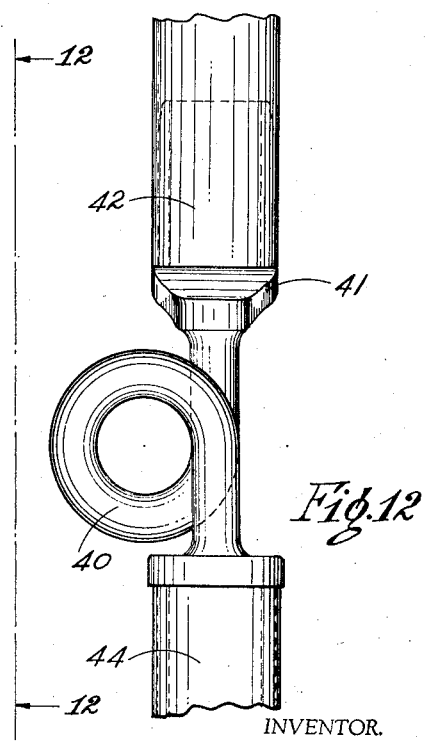
Figure 12 is a view taken on line 12—12 of Figure 11.

The construction shown in Figures 11 and 12 differs from that of Figures 9 and 10 in that coil springs 39 and 40, similar to that of Figure 7, are welded to a transversely extending plate 41 which is welded at its center to the post 42. The coil springs are provided with end pieces of low carbon steel and these end pieces are welded to the fork members 43 and 44.

In the fabrication of structures embodying my improved spring joints of the type which utilize low carbon steel end members welded to a high carbon steel spring member, the spring may be nickel or chrome plated or otherwise finished after it has been hardened and tempered to give it the desired spring characteristics. By uniting the end pieces to the tubular members by the joints and process of my co-pending applications, and by keeping the surfaces cool with a water bath during the welding the plated surface will not be discolored or injured in any way, and since no burr or flash is formed externally during such welding the joints are completely finished as they come from the welder.

Although I have described the illustrated embodiment of my invention in considerable detail, it will be understood by those skilled in the art that modifications and variations may be made without departing from the spirit of my invention. The various spring forms may be modified and changed to suit conditions and, of course, my spring joint construction may be used in a great variety of structures in addition to the seat frame and bicycle fork which are illustrated herein. I do not, therefore, wish to be limited to the specific embodiment of my invention shown and described herein but claim as my invention all modifications thereof coming within the scope of the appended claims.

I claim:

1. A resilient structure including a metal member, a spring unit including a member having spring characteristics and an annular resistance surface weld uniting said unit and said metal member, the effect of the heat of welding being insufficient to affect materially the spring characteristics of said unit.

2. A resilient structure including a metal tube, a spring unit including a member having spring characteristics and an annular resistance surface weld uniting said unit to said tube, the effect of the heat of welding being insufficient to affect materially the spring characteristics of said unit.

3. A resilient structure including a metal tube, a spring unit including a member having spring characteristics and an annular resistance surface weld uniting said unit to the end of said tube, the effect of the heat of welding being insufficient to affect materially the spring characteristics of said unit.

4. In a resilient structure including a member having a tubular portion, a spring unit including a member having spring characteristics and an annular resistance surface weld uniting said unit to said tubular portion, the effect of the heat of welding being insufficient to affect materially the spring characteristics of said unit.

5. A resilient structure including a metal tube, a member having spring characteristics, another member welded to said spring member, and an annular resistance surface weld uniting said other member to said tube the effect of the heat of welding of said resistance surface weld being confined to said other member and said tube.

6. A resilient structure including a plurality of metal tubes, a member having spring characteristics, metal members welded to said spring member and resistance surface welds uniting metal tubes to said metal members, the effect of the heat of welding of said resistance surface welds being confined to said metal members and said tubes.

7. A unitary, welded, strong, light weight, springy, metal frame, comprising a plurality of metal members arranged in the form of a frame of the desired shape, certain of said members being springy and being disposed between other stiffer members, and annular resistance surface welds joining said springy members to the adjacent stiffer members, the effect of the heat of welding being insufficient to affect materially the spring characteristics of said springy members.

8. A strong, light weight, springy frame, comprising a plurality of metal members secured together to constitute a unitary structure, said structure including a springy member and stiffer members, the springy member being disposed between certain of the stiffer members, and annular resistance surface welds between the springy and stiffer members.

9. A strong, light weight, springy frame, comprising a plurality of metal members secured together to constitute a unitary structure, said structure including a springy member and stiffer members, the springy member being disposed between stiffer members and attached thereto by annular resistance surface welds, certain of the stiffer members being welded to each other.

10. A strong, light weight, springy frame, comprising a plurality of metal members secured together to constitute a unitary structure, said structure including a springy member and stiffer members, the springy member being disposed between stiffer members, and annular resistance surface welds between the springy and stiffer members, certain of the stiffer members being tubular and being welded to each other by annular resistance surface welds.

11. A resilient structure including a plurality of metal tubes, a high carbon steel member having spring characteristics, low carbon steel members welded to said spring member, and resistance surface welds uniting metal tubes to said low carbon steel members, said steel spring member having spring characteristics which are substantially free of any effect of the heat of formation of said surface welds.

12. A springy structure including a metal tube, a flat metal spring member, and a resistance surface weld between an end of said tube and a surface of said metal spring member.

13. A structure including a high carbon steel member having spring characteristics, a low carbon steel member welded to said high carbon steel member, and another metal member welded to said low carbon steel member by a resistance surface weld, said high carbon steel member having a metallographic structure which is substantially uniform throughout.

KENNETH V. HART.